May 12, 1925.

S. MASON

TOOTH CLEANING DEVICE

Filed Nov. 19, 1923

Witnesses:

Inventor
Saul Mason
By Joshua R. H. Potts.
His Attorney.

Patented May 12, 1925.

1,537,853

UNITED STATES PATENT OFFICE.

SAUL MASON, OF DETROIT, MICHIGAN.

TOOTH-CLEANING DEVICE.

Application filed November 19, 1923. Serial No. 675,547.

*To all whom it may concern:*

Be it known that I, SAUL MASON, a citizen of the United States, and a resident of the city of Detroit, county of Wayne, and State of Michigan, have invented certain new and useful Improvements in Tooth-Cleaning Devices, of which the following is a specification.

This invention relates to new and useful improvements in tooth cleaning devices and has for its principal object the provision of an improved construction of this character which will be highly efficient in use and economical in manufacture. The present invention constitutes an improvement over that disclosed in my allowed application filed in the United States Patent Office on or about January 1, 1923, bearing Serial No. 610,958, for tooth brushes.

Among the several objects of the invention is the provision of a device of this character having a portion providing a holder for dental floss or the like and having a portion providing a brush, both of which are adapted for cleaning the teeth. A further object of the invention is the provision of a device of this character having a portion providing a holder for dental floss and a portion providing a brush, both of which form an integral part of the handle portion. A still further object of the invention is the provision of a cavity formed in the body of the device for the reception of a container within which the dental floss is confined for sanitary reasons.

Other objects will appear hereinafter.

The invention consists in the combinations and arrangements of parts hereinafter described and claimed.

The invention will be best understood by reference to the accompanying drawings showing the preferred forms of construction, and in which, Fig. 1 is a typical side elevation view of the invention;

Figure 1:
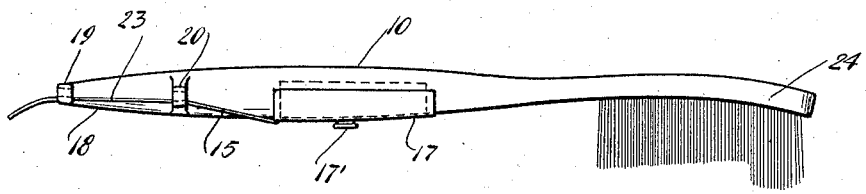
Figure 2:
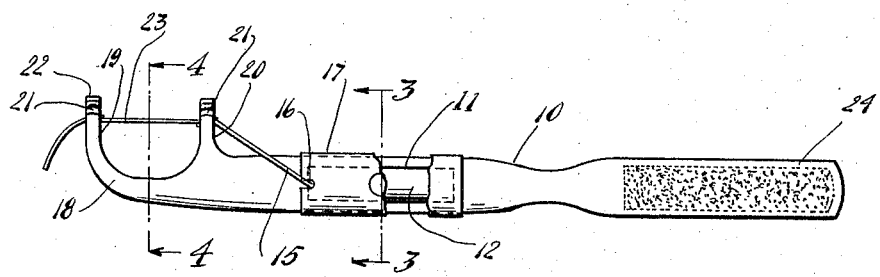
Fig. 2 is a plan view of the same.
Figure 3:
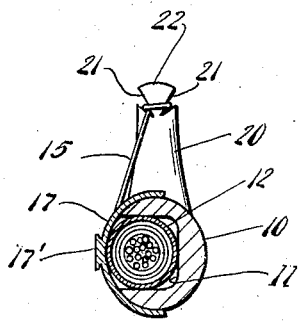
Fig. 3 is a sectional view of the same taken substantially on line 3—3 of Fig. 2.
Figure 4:
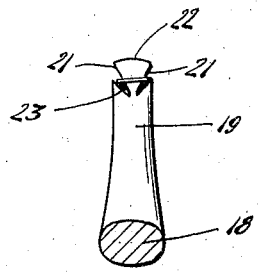
Fig. 4 is a sectional view taken substantially on line 4—4 of Fig. 2.
Figure 5:
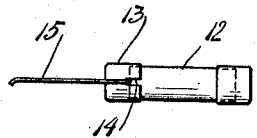
Fig. 5 is a side elevational view of the container embodied in the invention.

Referring to the drawings, especially to Figs. 1 to 5, inclusive, showing the preferred form of construction, 10 indicates a handle portion having a cavity 11 formed therein for the reception of a container 12 having a removable cap 13 with a slot 14 formed therein. Within the container 12 is confined dental floss 15, which is taken through the slot 14 of the removable cap 13 and through a registering slot 16 formed in a closure member 17 as best shown in Fig. 2. This closure member 17 is preferably formed of resilient material and is adapted when mounted to close the cavity 11, to embrace the handle portion 10 in the manner illustrated in Fig. 3, and in order to conveniently remove and replace this closure member I prefer to provide the same with a small knob 17′ as best shown in Fig. 1. The dental floss portion to be used to clean the teeth is held in operative position by a bow 18 which forms an integral part of the handle 10 and includes parallel projecting portions or fingers 19 and 20. These fingers 19 and 20 are provided with grooves 21 which taper downwardly from the extremities 22 of the fingers in V-shape form, for the purpose of firmly retaining the portion 23 of the floss in operative position, and in mounting the portion of the floss, to be used, between the fingers, it is preferred that the same be wrapped around the extremities so as to engage the grooves which are shown formed on opposite sides of each finger.

The device in its preferred form of construction further includes a tooth brush 24 which also forms an integral part of the handle 10 and the device in its entirety, when not in use, can be placed in a suitable casing, not shown.

Figure 7:
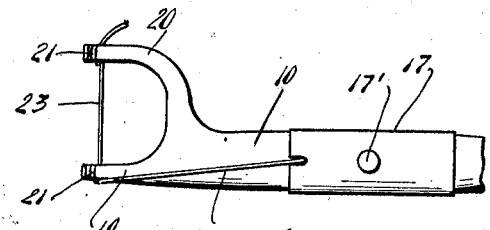
Figure 8:
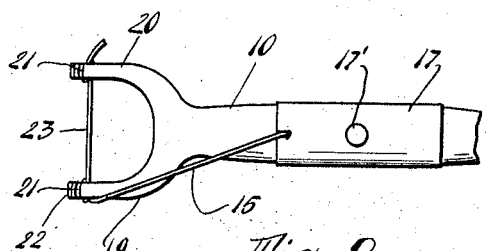

As shown in Fig. 2, the bow 18 has its finger portions extending substantially at right angles with respect to the handle portion 10, however, if desired, this bow can be formed as an integral part of the handle portion in the manner shown either in Fig. 7 or Fig. 8.

Figure 6:
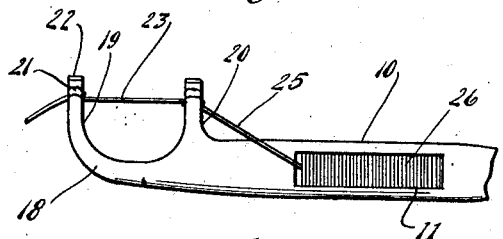
Figs. 6 to 8, inclusive, are fragmentary side elevational views showing modified forms of constructions of the invention.

In Fig. 6 I have shown a fragmentary view of a modified form of construction which is substantially similar to that illustrated in Fig. 2 with the exception that the dental floss which is indicated at 25 is in the form of a coil 26 and is mounted directly in the cavity 11′ instead of in the container 12 as is the case in the construction illustrated in Fig. 2.

While in the preferred form of construction I have indicated that a closure member is provided for closing the cavity it is well understood that this closure member may be dispensed with without destroying the utility of the device.

From the foregoing description it will be seen that in constructing the floss holder and tooth brush as an integral part of the handle that the cost of manufacture is greatly reduced and that the construction of the device is such that will accomplish all the objects of the invention.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent, is:

1. In combination with a handle member having a cavity and having a dental floss holding means, of a package of dental floss disposed in said cavity and a closure for said cavity embracing said handle member and having a slot through which the dental floss is taken for engagement with said dental floss holding means.

2. In combination with a handle member having a cavity and having dental floss holding means, of a package of dental floss disposed in said cavity and having a slot through which the dental floss is taken, and a closure for said cavity embracing said handle member and having a slot through which said floss is taken for engagement with said dental floss holding means.

3. In combination with a dental floss container having a slot formed therein through which the dental floss is taken, of a member having a cavity adapted to receive the container and provided with a holder for holding a portion of the dental floss in position for use, and a closure adapted to embrace said member for walling in said cavity.

4. In combination with a dental floss container having a slot formed therein through which the dental floss is taken, of a member having a cavity adapted to receive a container and provided with integral means for holding a portion of the dental floss in position for use, and a closure adapted to embrace said member for walling in said cavity.

5. In combination with a dental floss container having a slot formed therein through which the dental floss is taken, of a member having a cavity adapted to receive the container and provided with a holder for holding a portion of the dental floss in position for use, a closure adapted to embrace said member for walling in said cavity, and means affording a finger hold for bodily removing and replacing said closure member.

6. In combination with a dental floss container having a slot formed therein through which the dental floss is taken, of a member having a cavity adapted to receive the container and provided with integral means for holding a portion of the dental floss in position for use, a closure adapted to embrace said member for walling in said cavity, and means affording a finger hold for removing and replacing said closure member.

7. A tooth cleaning device including a handle portion having a cavity formed therein, a package of dental floss disposed within the cavity, a holder adapted to receive a portion of said dental floss, a tooth brush, a closure for the cavity embracing the handle portion and having an opening through which the dental floss is taken for engagement with said holder, said tooth brush and said holder being formed as an integral part of said handle portion.

8. A tooth cleaning device including a handle portion having a cavity formed therein, an integral holder including spaced parallel legs having downwardly tapered grooves formed therein, a container mounted in the cavity adapted to receive a coil of dental floss and provided with a slot through which the dental floss is taken to be mounted within the grooves, and a closure member adapted to embrace said handle portion for walling in said cavity.

9. A tooth cleaning device including a handle portion having a cavity formed therein, an integral holder including spaced parallel legs having downwardly tapered grooves formed therein, a container mounted in the cavity adapted to receive a coil of dental floss and provided with a slot through which the dental floss is taken to be mounted within the grooves, a closure member adapted to embrace said handle portion for walling in said cavity, and means affording a finger hold for removing and replacing said closure member.

In testimony whereof I have signed my name to this specification in the presence of two subscribing witnesses.

SAUL MASON.

Witnesses:
C. H. CHURCHILL,
HENRY I. FORSYTH.